United States Patent Office 3,725,097
Patented Apr. 3, 1973

3,725,097
CEMENT COMPOSITIONS AND THE PREPARATION THEREOF
Richard B. Peppler and Philip A. Rosskopf, South Euclid, Ohio, assignors to Martin Marietta Corporation, New York, N.Y.
No Drawing. Filed June 10, 1971, Ser. No. 151,896
Int. Cl. C04b 7/02
U.S. Cl. 106—90                                 36 Claims

ABSTRACT OF THE DISCLOSURE

The water content of hydraulic cement mixes for a given plasticity is reduced, and the strength of the hardened concrete produced therefrom is increased by the incorporation of inositol in said mixes. Early strength is increased, and the retardation of the rate of set is less than that normally encountered in obtaining the desired advantages in the properties of the mixes. The inositol is employed in an amount within the range of from about 0.005% to about 0.75% by weight, preferably from about 0.10% to about 0.25% by weight of cement. Set accelerators can also be incorporated in the cement mix, the properties of the accelerators and said inositol being additive so that an increase in the compressive strength of the hardened mix is achieved while, at the same time, increasing the rate of set of the mix including said inositol and accelerators.

BACKGROUND OF THE INVENTION

Field of the invention

This invention relates to hydraulic cement mixes. More particularly, it relates to such mixes in which improved properties are obtained upon hardening without adverse effect upon the set characteristics of the mixes.

Description of the prior art

It is a basic rule of cement technology that greater compressive strengths are obtained when reduced quantities of water are utilized in hydraulic cement mixes. Many admixtures employed to achieve such water reduction and improved compressive strength are known to act also as set retarders. As retarders, such admixtures slow the chemical process of hydration so that the concrete remains plastic and workable for a longer time than concrete without such a retarder. Among the materials commonly used for water reduction and improved compressive strength, which also act as set retarders, are the lignosulfonates, such as calcium lignosulfonate; salts of hydroxycarboxylic acids; sugars such as glucose (dextrose), maltose and the like; and highly polymerized polysaccharides, such as dextrins.

Admixtures having set retarding properties are sometimes employed primarily because of such properties, with improved compressive strength being a supplemental benefit. Retarders are used, for example, to delay the set of cement during difficult placements that require the concrete to be in a plastic condition for a longer than normal period of time. Retarders are also used to overcome undesired acceleration of set during hot weather.

In other circumstances, admixtures are added to achieve water reduction and greater strength although these benefits are accompanied by an undesired retardation of the rate of development of set and sometimes of early strength of the concrete. To overcome these undesirable effects, well known accelerators that increase the rate of hydration for early strength development are frequently used to overcome the retarding tendency of the water reducer. Calcium chloride and triethanolamine are commonly employed for this purpose. There is, nevertheless, a need in the industry for admixtures having the desired effect on compressive strength and water content, while reducing the retarding tendencies normally associated with such admixtures. In U.S. Pat. 3,432,317, saccharide polymers composed of glucose units having a size range of from three to one the order of twenty-five glucose units are disclosed as being more advantageous than more highly polymerized polysaccharides and more highly depolymerized products. As these exists a wide range of admixtures for achieving specific modifications in the properties of cement mixes and hardened concrete products, there also exists a need for additional admixtures that enhance desired properties of hardened concrete while producing less of the corresponding undesired effects than was accomplished with many of the conventional admixtures, such as those referred to hereinabove.

It is an object of the present invention, therefore, to provide an improved hydraulic cement mix.

It is another object of the invention to provide a process for increasing the strength of concrete without undue retardation of the rate of set and early strength.

It is another object of the invention to provide a hydraulic cement mix having enhanced compresive strength and reduced water requirements for a given plasticity together with an acceptable rate of set.

It is a further object of the invention to provide a process for producing a hydraulic cement mix having improved compressive strength and an acceleration in the rate of set.

It is a further object of the invention to provide a hydraulic cement mix having improved compressive strength and an acceleration in the rate of set.

With these and other objects in mind, the invention is hereinafter set forth in detail, the novel features thereof being particularly pointed out in the appended claims.

SUMMARY OF THE INVENTION

The objects of the invention are achieved by the incorporation of inositol into hydraulic cement mixes in an amount sufficient to increase the compressive strength of the hardened concrete upon setting of said mixes. Compressive strength of said mixes, including early strength, is increased thereby, the water requirements of the mix are lowered, and the retardation of the rate of set is less than that normally accompanying such improvement in the compressive strength of the hardened mix. The improvement in the compressive strength of the hardened concrete obtained by the incorporation of inositol in the hydraulic cement mix is enhanced by the greater dosages of inositol that can be employed, with accompanying increase in strength, compared with other known admixtures without excessive retardation of set. Where excessive retardation of set is tolerable in particular circumstances, the use of still larger dosages of inositol result in further improvements in the compressive strength of the hardened concrete. By the use of small amounts of conventional accelerators in addition to inositol, the desired improvements in compressive strength are obtained while accelerating the rate of hydration and set.

DETAILED DESCRIPTION OF THE INVENTION

Inositol, $C_5H_6(OH)_6 \cdot 2H_2O$, is also known as hydroxycyclohexane and as cyclohexanehexol and cyclohexitol. It is a commercially available product prepared from corn steep liquor by precipitation and hydrolysis of crude phytate. Inositol exists in the form of white crystals, odorless up to 224–227° C., anhydrous at 100° C., and soluble in water.

In the practice of the present invention, inositol is incorporated in hydraulic cement mixes, such as Portland cement concretes and mortars, and dry mixes for making such concretes and mortars, in amounts sufficient to increase the compressive strength of the hardened mix upon setting thereof. For this purpose, inositol will generally be incorporated into said cement mixes in an amount within the range of from about 0.005% to about 0.75% by weight of cement. Within this range, appreciable improvement in strength is obtained when inositol is incorporated in an amount ranging from about 0.025% to about 0.25%, with retardation of the rate of hardening being minimized at inositol additions within the range of from about 0.025% to about 0.10% by weight of cement. At dosages above 0.25%, particularly in the range of from about 0.50% to about 0.75% by weight of cement, increasing amounts of inositol continue to result in further improvement in compressive strength although the retardation of the rate of set also increases at such higher inositol dosages.

For purposes of illustrating the advantageous results obtainable by the practice of the present invention, plain concrete mixes were prepared and compared with such mixes in which inositol has been incorporated in varying dosages. The same type and brand of cement was used in each mix, and the proportion and kind of coarse and fine aggregate employed were substantially the same. A sufficient amount of water was added to each mix to effect hydraulic setting of the cement and to produce concrete mixes of essentially the same consistency, as measured by the slump cone.

The results were as shown below in Table No. I:

dextrose produced a 7-day compressive strength of 3375 p.s.i. and a 28-day strength of 5250 p.s.i. Retardation of the rate of set was 2½ hours at this dosage level, as compared with the ½ hour retardation produced by inositol in corresponding mix No. 5. As the dosage of dextrose is increased beyond this level, excessive retardation of set is observed. The results shown for Cement No. 2, i.e. mix Nos. 6–10, on the other hand, clearly indicate that inositol can be added in dosages of up to 0.25% with less retardation of set than produced by dextrose at about 0.100%. As also shown by the results for said Cement No. 2, such larger inositol dosages result in a greater improvement in 28-day compressive strength than is obtained with acceptable levels of dextrose. Such significant improvements are obtained with inositol at dosages of up to about 0.25%, excessive retardation being observed as larger dosages of inositol are employed. In those applications in which excessive retardation as defined by ASTM standards can be tolerated or is desired, further highly significant improvements in 28-day compressive strength can be achieved, particularly as evidenced by the results for cement mix No. 10, at the 0.75% additive level. The improvement in terms of reducing water requirements achieved by use of inositol is particularly apparent at the higher dosage levels of inositol.

It is within the scope of the invention to incorporate in the cement mixes prepared as herein provided other additives known in the art for the express purpose for which they are normally employed. Such other additives may, for example, be air-entraining agents, air-detraining

TABLE I

| Mix No: | Additive | Percent addition additive by wt. cement | Water, gal./ cu. yd. of concrete | Air, vol. percent of concrete | Compressive strength of concrete, p.s.i. in— 7 days | 28 days | Rate of hardening relative to plain mix, hrs.[1] |
|---|---|---|---|---|---|---|---|
| Cement No. 1: | | | | | | | |
| 1 | None | | 35.7 | 1.5 | 2,870 | 4,630 | 0. |
| 2 | Inositol | 0.025 | 35.4 | 1.5 | 2,880 | 4,810 | 0. |
| 3 | do | 0.050 | 35.2 | 1.5 | 3,000 | 5,025 | +¼. |
| 4 | do | 0.075 | 35.0 | 1.5 | 3,055 | 5,040 | 0. |
| 5 | do | 0.100 | 35.0 | 1.5 | 3,115 | 5,265 | +½. |
| Cement No. 2: | | | | | | | |
| 6 | None | | 37.1 | 1.6 | 2,735 | 4,405 | 0. |
| 7 | Inositol | 0.15 | 35.5 | 1.8 | 3,085 | 5,070 | +1. |
| 8 | do | 0.25 | 34.8 | 2.0 | 3,165 | 5,400 | +1½. |
| 9 | do | 0.50 | 34.6 | 1.9 | 3,085 | 5,500 | Ex. re. setting.[2] |
| 10 | do | 0.75 | 33.8 | 1.9 | 2,960 | 5,890 | Excessive retardation. |

[1] Retardation of set is indicated by a (+) sign.
[2] Excessive retardation of set per ASTM standards is 3½ hours or more.

By way of comparison, mixes of the type employed in Cement No. 1 were prepared in which dextrose was employed as an admixture in place of the inositol incorporated in mix Nos. 2–5. While dextrose produced somewhat larger improvements in compressive strength than accomplished by inositol at relatively smaller dosages, such increase in strength was accompanied by a more rapid rate of retardation of the rate of set, reaching excessive retardation at a much lower dosage level than that at which inositol causes excessive retardation. Thus, at an 0.025% dosage, dextrose produced a 7-day strength of 3110 p.s.i. and a 28-day strength of 4840 p.s.i. without noticeable effect on the rate of set. At a dosage level of 0.100%, agents, pozzoulanic materials, fly-ash, coloring agents, water repellents, set accelerators, and the like. Inositol may also be employed in conjunction with a combination of such cement additives to produce desired changes in the physical properties of the concrete being produced. In this regard, it should be noted that inositol is significantly additive in its effect on concrete when employed with other agents known in the art. This additive effect is illustrated by the results set forth in Table No. II relating to the use of inositol in combination with known set accelerators, the preparation of the cement mixes and the method of testing being the same as described above with reference to Table No. I.

TABLE II

| Mix No. | Percent addition of additive [2] | | | Water, gal./cu. yd. of concrete | Air, vol. percent of concrete | Compressive strength of concrete, p.s.i. in— | | Rate of hardening relative to plain mix, hrs.[1] |
|---|---|---|---|---|---|---|---|---|
| | Inositol | CaCl₂ | Triethanolamine | | | 7 days | 28 days | |
| Cement No. 1: | | | | | | | | |
| 1 | | | | 37.1 | 1.6 | 2,735 | 4,405 | 0 |
| 2 | 0.10 | | | 35.8 | 1.7 | 3,165 | 5,150 | +½ |
| 3 | | | 0.010 | 35.4 | 1.8 | 3,345 | 5,350 | −½ |
| 4 | 0.10 | | 0.020 | 34.8 | 2.0 | 3,515 | 5,420 | −¼ |
| Cement No. 2: | | | | | | | | |
| 5 | | | | 36.7 | 1.6 | 2,755 | 4,625 | |
| 5 | | | | 36.7 | 1.6 | 2,755 | 4,625 | |
| 6 | 0.065 | 0.065 | 0.020 | 34.5 | 2.2 | 3,690 | 5,860 | |

[1] Retardation of set is indicated by a (+) sign and acceleration of set by a (−) sign.
[2] On a solids basis, based on the weight of cement.

The results set forth in Table No. II clearly show that the effects of inositol and conventional accelerators are additive so that a desired combination of benefits can be achieved by the use of inositol with one or more set accelerating agents. Thus, both the water requirements and the 7- and 28-day compressive strengths of mixes 2–4 of Cement No. 1 are improved over the results for mix No. 1 when inositol is incorporated into the mix together with triethanolamine. Significantly, these desired benefits are obtained without any retarding effect on the setting time of the concrete. The data for cement mixes 5 and 6 of Table No. II demonstrate the effetcivess of a three-component admixture comprising inositol, triethanolamine and calcium chloride with respect to the water requirements of the mix, 7- and 28-day compressive strength and the setting time of the concrete.

It is also within the scope of the invention to employ inositol together with known set retarders, such as lignosulfonates, sugars, glucosaccharides, and the like, or combinations thereof to obtain improvement in the compressive strength of the hardened mix, but with less retarding effect than would result from such set retarders. Inositol and said known set retarders can also be employed together with conventional set accelerators as mentioned above to achieve a desired combination of benefits. For example, inositol has been employed together with glucosaccharides to achieve improved compressive strength, the presence of inositol reducing the amount of TEA and $CaCl_2$ employed below that required in the absence of the inositol to produce a rate of hardening equal to that of the concrete mix of lower compressive strength in the absence of such admixtures. Similar results can be obtained when other set retarders, such as lignosulfonates, are used together with inositol and known accelerators.

Inositol, therefore, is an additive for hydraulic cement mixes that offers significant advantages in the art, permitting highly desirable benefits to the art. While the invention has been described herein with reference to particular embodiments thereof, it will be appreciated that various changes and modifications can be made therein without departing from the scope of the invention as set forth in the appended claims.

Therefore, we claim:

1. A hydraulic cement mix comprising cement, aggregate, sufficient water to effect hydraulic setting of the cement, and an additive comprising inositol, said additive being present in an amount above about .005% by weight of cement sufficient to increase the compressive strength of the hardened concrete formed upon setting of said mix, whereby a reduction of the water content of the mix for a given plasticity and an increase in the compressive strength of the hardened concrete is achieved while minimizing the retarding of the rate of set and the development of early strength that normally accompany such an improvement in the compressive strength of hardened concrete.

2. The mix of claim 1 in which said inositol is present in an amount within the range of from about 0.005% to about 0.75% by weight of cement.

3. The mix of claim 2 in which said inositol is present in an amount within the range of from about 0.025% to about 0.25% by weight of cement.

4. The mix of claim 3 in which said inositol is present in an amount within the range of from about 0.025% to about 0.10% by weight of cement.

5. The mix of claim 4 in which said range is from about 0.05% to about 0.10% by weight.

6. The mix of claim 1 in which said range is from about 0.50% to about 0.75% by weight of cement, whereby the increase in strength of the hardened mix is enhanced in applications in which excessive retardation of set can be tolerated.

7. The hydraulic mix of claim 1 and including therein an admixture comprising a set accelerating agent in an amount sufficient to accelerate the rate of hardening of the cement, the effect of said inositol and said accelerating agent being additive so as to increase the rate of hardening of the mix while at the same time enhancing the compressive strength of the hardened mix.

8. The mix of claim 7 in which said accelerating agent is taken from the group consisting of triethanolamine, calcium chloride and combinations thereof.

9. The mix of claim 8 in which said accelerating agent comprises calcium chloride.

10. The mix of claim 8 in which said accelerating agent comprises triethanolamine.

11. The mix of claim 8 in which said inositol is employed in an amount within the range of from about 0.005% to about 0.75% by weight of cement.

12. The mix of claim 8 in which said inositol is employed in an amount within the range of from about 0.025% to about 0.10% by weight of cement.

13. The mix of claim 8 and including therein a set retarding admixture.

14. A process for improving the properties of hydraulic cement mixes comprising cement, aggregate and sufficient water to effect hydraulic setting of the cement, said process comprising adding inositol to said mix in an amount above about .005% by weight of cement sufficient to increase the compressive strength of the hardened concrete formed upon setting of the cement mix, whereby a reduction in the water content of the mix for a given plasticity and an increase in the compressive strength of the hardened concrete is achieved while minimizing the retarding of the rate of set and the development of early set of the resulting concrete normally accompanying such improvement in compressive strength.

15. The process of claim 14 in which said inositol is employed in an amount within the range of from about 0.005% to about 0.75% by weight of cement.

16. The process of claim 15 in which said inositol is employed in an amount within the range of from about 0.025% to about 0.25% by weight.

17. The process of claim 16 in which said inositol is employed in an amount within the range of from about 0.025% to about 0.10% by weight of cement.

18. The process of claim 17 in which said range is from about 0.05% to about 0.10% by weight.

19. The process of claim 14 in which said range is from about 0.50% to about 0.75% by weight of cement.

20. The process of claim 14 and including adding an admixture comprising a set accelerating agent in an amount sufficient to accelerate the hardening of the cement, the effect of said inositol and said accelerating agent being additive so as to increase the rate of hardening of the mix while at the same time enhancing the compressive strength of the hardened mix.

21. The process of claim 20 in which said accelerating agent is taken from the group consisting of triethanolamine, calcium chloride and combinations thereof.

22. The process of claim 21 in which said inositol is added in an amount within the range of from about 0.005% to about 0.75% by weight of cement.

23. The process of claim 20 in which said range is from about 0.025% to about 0.10% by weight of cement.

24. A dry hydraulic cement mix comprising cement and an additive comprising inositol, said additive being present in an amount above about .005% by weight of cement sufficient to increase the compressive strength of the hardened concrete formed after sufficient water is added to the dry cement mix to effect hydraulic setting of the cement, whereby a reduction of the water content and an increase in the compressive strength of the hardened concrete is achieved while minimizing the retarding of the rate of set and the development of early strength that normally accompany such an improvement in the compressive strength of the hardened concrete.

25. The mix of claim 24 in which said inositol is present in an amount within the range of from about 0.005% to about 0.75% by weight of cement.

26. The mix of claim 25 in which said inositol is present in an amount within the range of from about 0.025% to about 0.25% by weight of cement.

27. The mix of claim 26 in which said inositol is present in an amount within the range of from about 0.025% to about 0.10% by weight of cement.

28. The mix of claim 27 in which said range is from about 0.05% to about 0.10% by weight.

29. The mix of claim 24 in which said range is from about 0.50% to about 0.75% by weight of cement, whereby the increase in strength of the hardened mix is enhanced in applications in which excessive retardation of set can be tolerated.

30. The hydraulic mix of claim 24 and including therein an admixture comprising a set accelerating agent in an amount sufficient to accelerate the rate of hardening of the cement, the effect of said inositol and said accelerating agent being additive so as to increase the rate of hardening of the mix while at the same time enhancing the compressive strength of the hardened mix.

31. The mix of claim 30 in which said accelerating agent is taken from the group consisting of triethanolamine, calcium chloride and combinations thereof.

32. The mix of claim 31 in which said accelerating agent comprises calcium chloride.

33. The mix of claim 31 in which said accelerating agent comprises triethanolamine.

34. The mix of claim 31 in which said inositol is employed in an amount within the range of from about 0.005% to about 0.75% by weight of cement.

35. The mix of claim 31 in which said inositol is employed in an amount within the range of from about 0.025% to about 0.10% by weight of cement.

36. The mix of claim 31 and including therein a set retarding admixture.

References Cited
UNITED STATES PATENTS

| | | | |
|---|---|---|---|
| 3,432,317 | 3/1969 | Kelly et al. | 106—92 |
| 3,090,692 | 5/1963 | Kelly et al. | 106—92 |
| 2,311,288 | 2/1943 | Booth | 106—92 |

JAMES E. POER, Primary Examiner

U.S. Cl. X.R.

106—92, 97, 314

UNITED STATES PATENT OFFICE
CERTIFICATE OF CORRECTION

Patent No. 3,725,097      Dated Apr. 3, 1973

Inventor(s) Richard B. Peppler et al

It is certified that error appears in the above-identified patent and that said Letters Patent are hereby corrected as shown below:

In Column 2, line 6, change "one" to -- on --; line 9, change "these" to -- there --; line 23, change "compresive" to -- compressive --; line 63, change "$C_5H_6(OH)_6 \cdot 2H_2O$" to -- $C_6H_6(OH)_6 \cdot 2H_2O$ --.

In Column 3, TABLE I, the 6th heading in the Table, change
" Compressive                        -- Compressive
  strength of           to           strength of
  concrete, p.s.i. in-"             concrete, psi -- ;

same table, the 6th column, the first listing under "7 days" - change "2.870" to -- 2,870 --.

In Column 4, TABLE II, the 7th heading in the Table, change
" Compressive                        -- Compressive
  strength of                     strength of
    concrete,                          concrete, psi --.
    p.s.i. in-"           to Signed and sealed this 18th day of September 1973.

(SEAL)
Attest:

EDWARD M. FLETCHER, JR.           RENE D. TEGTMEYER
Attesting Officer                    Acting Commissioner of Patents